Sept. 8, 1959     R. A. HENLE     2,903,604
MULTISTABLE CIRCUIT
Filed Jan. 3, 1955     8 Sheets-Sheet 1
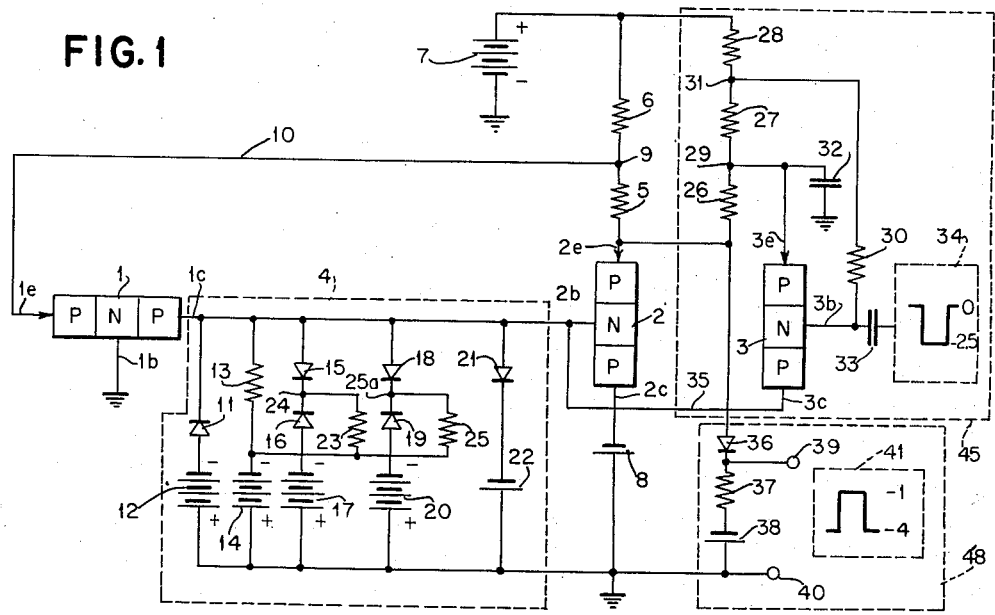
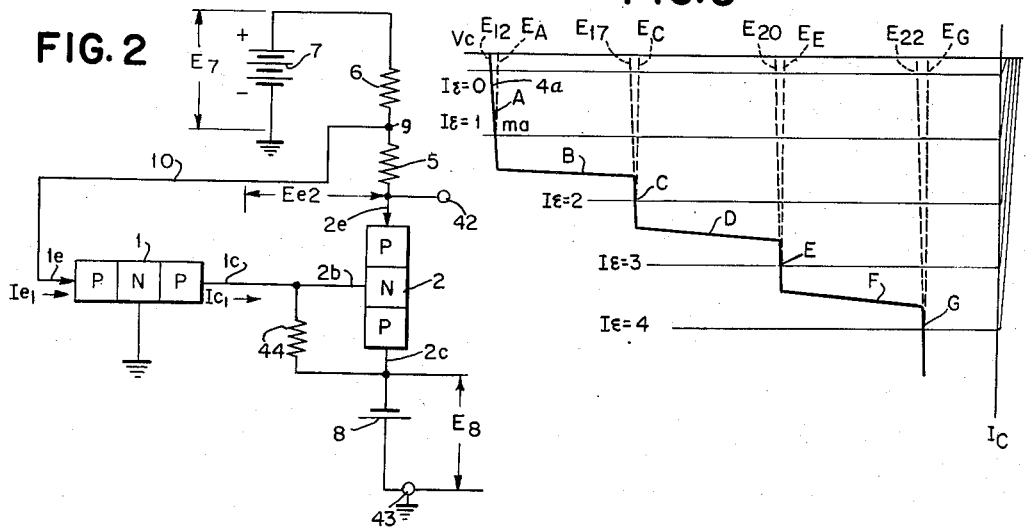
*INVENTORS*
ROBERT A. HENLE
BY
*P. E. Henninger*
ATTORNEY

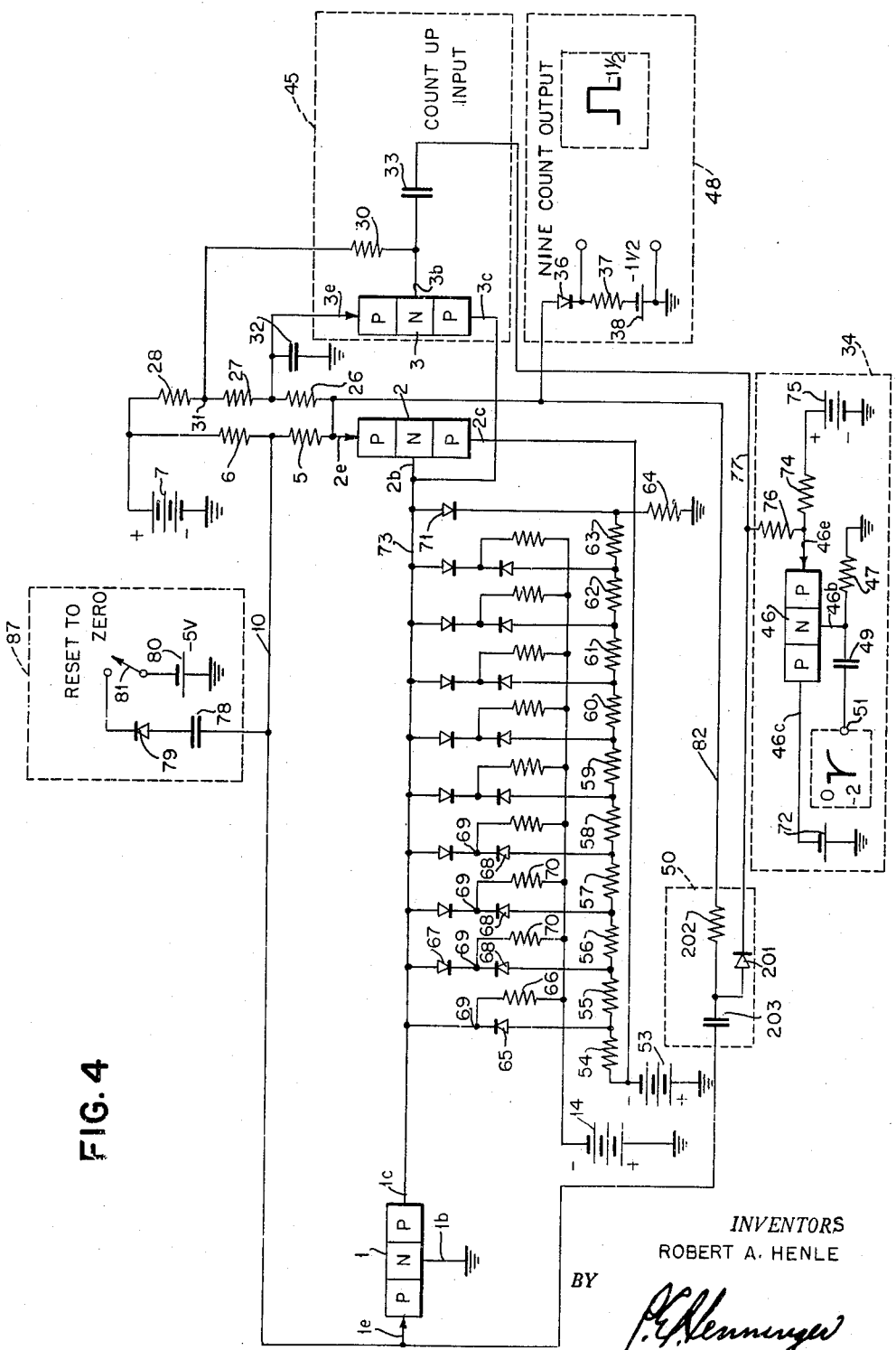

Sept. 8, 1959                    R. A. HENLE                    2,903,604
                              MULTISTABLE CIRCUIT
Filed Jan. 3, 1955                                         8 Sheets-Sheet 3

INVENTORS
ROBERT A. HENLE
BY
ATTORNEY

Sept. 8, 1959        R. A. HENLE        2,903,604

MULTISTABLE CIRCUIT

Filed Jan. 3, 1955        8 Sheets-Sheet 4

INVENTORS
ROBERT A. HENLE
BY
ATTORNEY

Sept. 8, 1959 R. A. HENLE 2,903,604
MULTISTABLE CIRCUIT
Filed Jan. 3, 1955 8 Sheets-Sheet 5
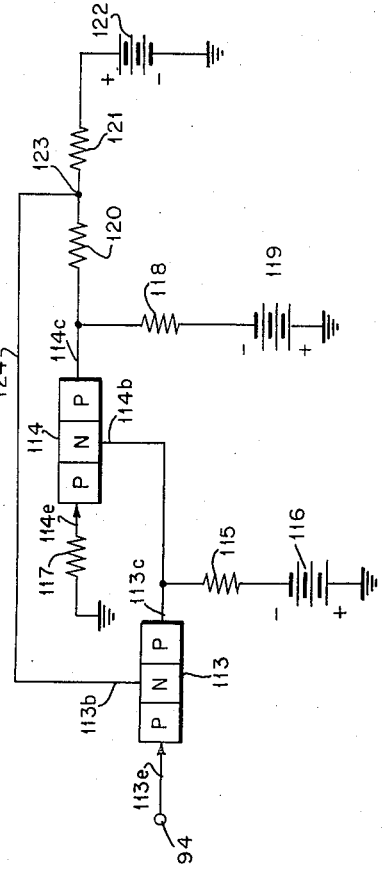
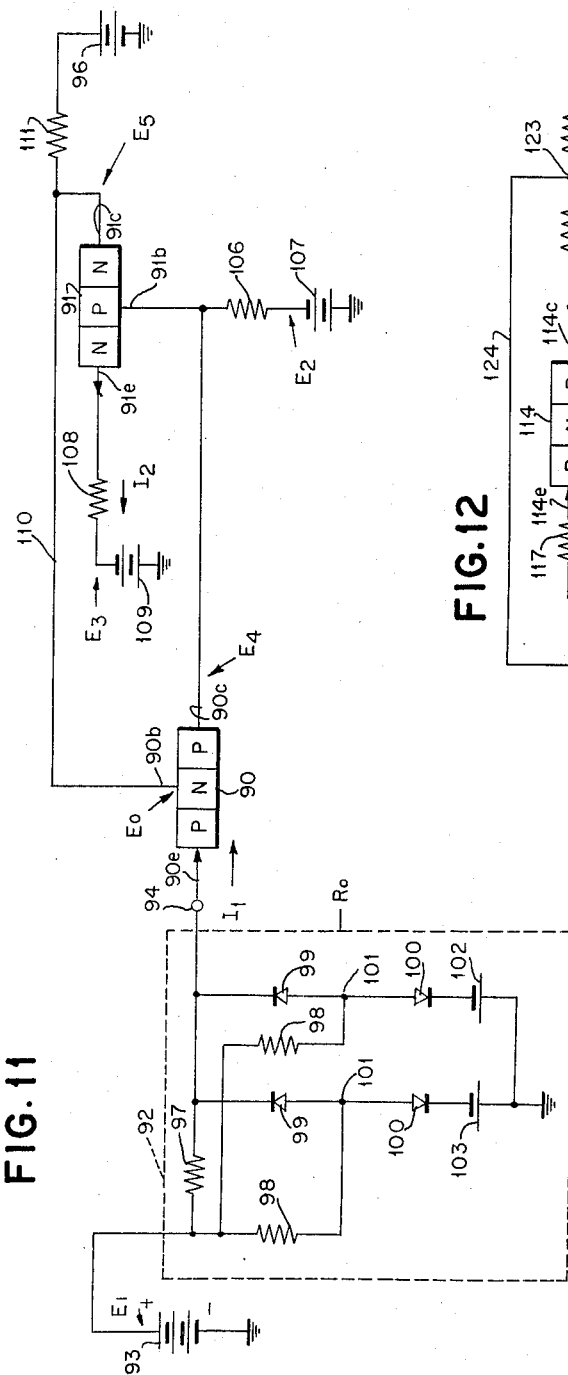
INVENTORS
ROBERT A. HENLE
BY
*P.E. Henninger*
ATTORNEY

*INVENTORS*
ROBERT A. HENLE
ATTORNEY

Sept. 8, 1959

R. A. HENLE 2,903,604

MULTISTABLE CIRCUIT

Filed Jan. 3, 1955

INVENTORS
ROBERT A. HENLE

BY

*P.G. Herminger*

ATTORNEY

Sept. 8, 1959

R. A. HENLE 2,903,604

MULTISTABLE CIRCUIT

Filed Jan. 3, 1955

INVENTORS
ROBERT A. HENLE

BY

ATTORNEY

United States Patent Office 2,903,604
Patented Sept. 8, 1959

2,903,604

MULTISTABLE CIRCUIT

Robert A. Henle, Hyde Park, N.Y., assignor to International Business Machines Corporation, New York, N.Y., a corporation of New York Application January 3, 1955, Serial No. 479,413

19 Claims. (Cl. 307—88.5)

This invention relates to electrical circuits having a multiplicity, i.e., more than two, of stable output states.

There has come into widespread use in recent years a type of electric circuit known as a bistable circuit, having two distinct stable output states. Such circuits are shiftable back and forth between their output states in response to successive input signals, which may, for example, be square wave signals. Such circuits have a large number of uses, particularly in the field of high speed electrical computers. For example, they are used as triggers and also as counters. When a bistable circuit is used as a counter it is necessarily limited to counting in accordance with the binary system, in which each numerical order includes only two digits. The two digits of an order are then represented by the two stable output states of the bistable circuit. One bistable circuit must be provided for each binary order in a counter of that type. Where large numbers are involved, the number of binary orders is likewise large, and the circuits required become large and complex.

Circuits constructed in accordance with the present invention have more than two stable output states. There is theoretically no limit as to the number of stable output states which may be designed into a single stage circuit. Practically, however, in order that the several stable output states may remain distinct, the number of such output states is limited by the accuracy with which the resistances of the various impedance elements may be determined. It is quite easy, in accordance with the present invention, to provide a circuit having ten stable output states, which is serviceable as a decimal counter.

The multistable circuits of the present invention use a novel impedance network identified herein by the generic term "step function impedance means." By this term is meant an impedance means whose volt-ampere characteristic has a form approximating that of the profile of a flight of steps or stairs.

An object of the present invention is to provide a multistable circuit.

Another object of the invention is to provide a novel counter utilizing a multistable circuit.

Another object is to provide step function impedance means which may be used to load a translating device.

The foregoing and other objects of the invention are attained in the circuits described herein by providing a translating device, typically a transistor, with step function impedance means connected to it as a load. The output of that device is connected through suitable feedback means, which may include another translating device, to the input of the first device. Such a circuit has a multiplicity of stable output states, the number of such output states depending upon the number of steps provided by the step function impedance means. A multistable circuit of the type just described is readily adaptable for use as a counter, by providing an input gate circuit which switches the multi-stable circuit from one of its states to the next in response to an input pulse. An output gate is provided for producing an output signal when the multi-stable circuit has counted its full range of states. For example, in the case of a decimal counter, an output gate is provided to produce an output pulse when the multistable circuit reaches its tenth stable state. Either count-up or count-down input gates may be provided, with corresponding high end or low end output gates. Set and reset means may be provided as desired for establishing the multistable circuit in one or the other of its two end states.

The step function impedance means illustrated comprises a network including a plurality of branches. A typical branch consists of first and second oppositely poled diodes connected to a common junction, said first diode having its opposite terminal connected to a biasing battery. The second diode has its opposite terminal connected to the output terminal of a translating device, typically the collector of a transistor. The common junction is connected through a load resistor to a load supply battery. With this arrangement, whenever the potential at the collector is below the potential of the biasing battery, then the second diode is reversely biased and no current flows from the collector through the load resistor. As the potential of the collector increases, it eventually becomes greater than that of the biasing battery, whereupon current flows from the collector through the load resistor, which is thereby added to the load on the transistor. By connecting several such branches to the collector, with different biasing potentials in each branch, a load impedance is constructed whose effective impedance varies in steps as the collector potential changes.

Other objects and advantages of the invention will become apparent from a consideration of the following specification and claims, taken together with the accompanying drawings.

In the drawings:

Fig. 1 is a wiring diagram of a counter including a multistable circuit embodying the invention;

Fig. 2 is a wiring diagram of a simplified circuit similar to that employed in Fig. 1, illustrating the principles on which the circuit of Fig. 1 operates;

Fig. 3 is a graphical illustration of the collector volt-ampere characteristics of one of the transistors in the circuit of Fig. 1, with a step function load line superimposed thereon;

Fig. 4 is a wiring diagram of a complete decimal counter circuit incorporating a multistable circuit, and also including a count-up input, a nine count output and reset means;

Fig. 11 is a wiring diagram of a modified form of counter circuit embodying the invention;

Fig. 12 is a fragmentary wiring diagram of still another form of counter circuit embodying the invention;

FIGS. 1 TO 3

Figure 7:
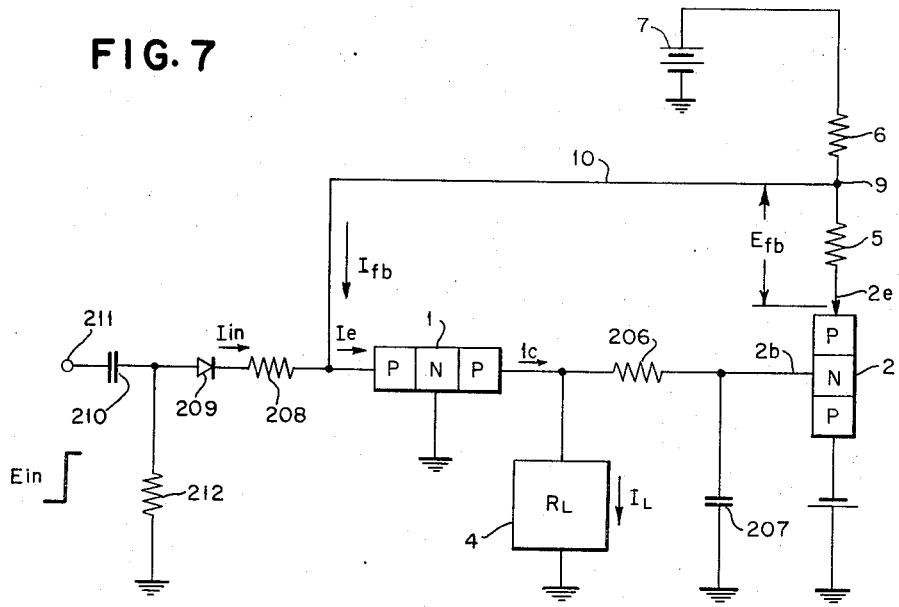
Fig. 7 is a wiring diagram showing still another form of input gate which may be used with the circuit of Fig. 1 or the circuit of Fig. 4.
Figure 6:
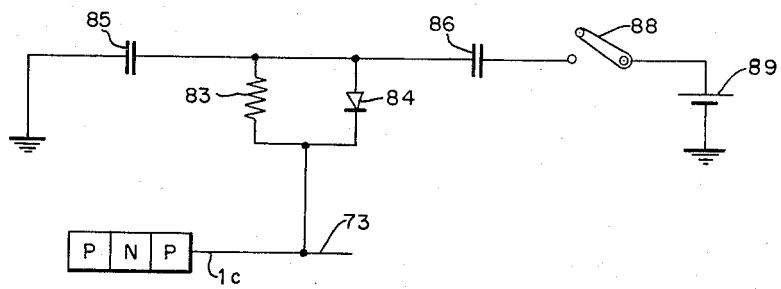
Fig. 6 is a fragmentary wiring diagram showing an alternative form of count-up input gate which may be used in place of the input gate of Fig. 4.
Figure 5:
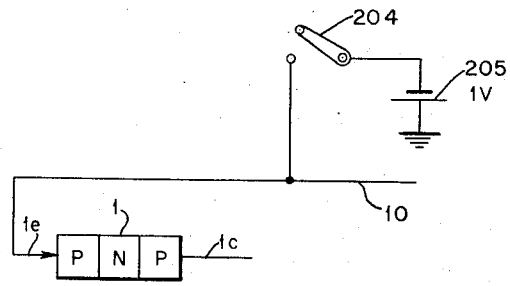
Fig. 5 is a fragmentary wiring diagram showing an alternative zero reset circuit which may be used in place of the manual reset circuit of Fig. 4.

Figure 1 includes a multistable circuit employing PNP junction transistors 1 and 2, having emitter electrodes 1e and 2e, base electrodes 1b and 2b, and collector electrodes 1c and 2c. Associated with this multistable circuit is an input gate 45 including a PNP junction transistor 3 having an emitter electrode 3e, a base electrode 3b, and a collector electrode 3c.

The transistor 1 is connected in a grounded base amplifier stage. Its base 1b is connected to ground and its collector 1c is connected to a step function impedance load, generally indicated by the reference numeral 4. A feedback is provided between collector 1c and emitter 1e, this feedback including transistor 2 which is connected in a grounded collector amplifier stage. Base 2b is directly connected to collector 1c. The load on transistor 2 is connected to its emitter 2e and comprises two resistors 5 and 6 connected in series with a load battery 7. A biasing battery 8 is connected between collector 2c and ground. The feedback mentioned above may be traced from the common junction 9 between the resistors 5 and 6 through wire 10 to the emitter 1e of transistor 1.

The step function impedance load 4 is an electrical network including five branches connected between collector 1c and ground. One of these branches may be traced from collector 1c through a diode 11 and a battery 12 to ground. A second of these branches may be traced through a load resistor 13 and a battery 14 to ground. A third of these branches extends through oppositely poled diodes 15 and 16, and battery 17 to ground, and includes a load resistor 23 connected between the common junction 24 of diodes 15 and 16 and the negative terminal of battery 14. The fourth of these branches extends through oppositely poled diodes 18 and 19 and a battery 20 to ground, and includes a load resistor 25 connected between the common junction 25a of diodes 18 and 19 and the negative terminal of battery 14. The fifth branch may be traced through diode 21 and a battery 22 to ground.

The batteries 12, 14, 17, 20 and 22 are all connected with their positive terminals grounded. Battery 14 has a much greater potential than any of the others, for example, 300 volts. Batteries 12, 17, 20 and 22 have potentials decreasing from one to the other, in the order named. For example, their potentials may respectively be 10, 7.5, 5 and 2.5 volts.

The input gate 45 includes, in addition to transistor 3, three resistors 26, 27 and 28 connected in series, the series group being connected in parallel with load resistors 5 and 6. Emitter 3e of transistor 3 is connected to the common junction 29 between resistors 26 and 27. Base 3b is connected through a resistor 30 to the common junction 31 between resistors 27 and 28. A capacitor 32 is connected between junction 29 and ground. Base 3b is connected through a capacitor 33 to a square wave input signal generator schematically indicated at 34. Generator 34 may have, for example, a no-signal potential of 0 volts and a signal potential of —2.5 volts. Collector 3c is connected through a wire 35 to base 2b.

Emitter 2e is connected to an output gate 48 comprising a diode 36, a resistor 37 and a battery 38 in series, the opposite terminal of battery 38 being connected to ground. The terminal of resistor 37 nearest diode 36 is connected to an output terminal 39. Another output terminal 40 is grounded. The circuit of Fig. 1 produces between the output terminals 39 and 40 output signals illustrated within a frame 41 as being square waves varying between a no-signal potential of —4 volts and a signal potential of —1 volt.

OPERATION OF FIG. 1

In order that the operation of the circuit of Fig. 1 may be readily understood, it is desirable first to consider the circuit of Fig. 2, which comprises the circuit fo Fig. 1 stripped down to its essentials, and employing a conventional load in place of the step function impedance load 4 of Fig. 1. Those circuit elements of Fig. 1 which appear in the stripped down circuit of Fig. 2 have been given the same reference numerals, and will not be further described.

The circuit of Fig. 2 is a two stage transistor amplifier circuit, the transistor 1 being connected with its base grounded and the transistor 2 with its collector nominally grounded. The output of the second stage is fed back to the input of the first stage. Output terminals 42 and 43 are respectively connected to the emitter 2e and to ground.

Consider now the factors which determine whether the circuit of Fig. 2 is to be stable or unstable. A grounded base transistor amplifier stage, such as that including the transistor 1, has a current amplification substantially equal to 1.

For each differential increment of current through collector 1c, there is a corresponding increment of current through base 2b. Similarly, for each differential increment of current through base 2b, there is a corresponding increment of current through emitter 2e. Furthermore, for each differential increment of current through emitter 2e, there is a corresponding differential increment of current fed back through wire 10 to emitter 1e. Taking all these relationships together, it may be stated that for each differential increment of current flowing through collector 1c, there is a corresponding differential increment of current fed back through wire 10.

Let $I_c1$ represent the current flow through collector 1c
Let $I_e1$ represent the current flow through emitter 1e
Let $$B' = \frac{dI_e1}{dI_c1}$$

That is to say, B' represents the differential ratio between the current fed back to emitter 1e and the current through collector 1c. Since the current amplification factor of the stage including transistor 1 is substantially equal to 1, it may be seen that if B' is greater than 1, then an increasing collector current produces a more rapidly increasing emitter current, which in turn produces a further increase in collector current. Hence, the circuit is unstable. On the other hand, if B' is less than 1, then an increase in the collector current produces a smaller increase in the emitter current and the circuit is stable.

Let us now determine which circuit parameters affect B', so that the circuit may be designed for stability or instability, as required.

Let $E_7$ be the potential of the positive terminal of battery 7,
$R_6$ be the resistance of resistor 6
$E_{e2}$ be the potential of emitter 2e
$R_5$ be the resistance of resistor 5
$E_8$ be the potential of the negative terminal of battery 8
$R_{44}$ be the resistance of resistor 44.

It may be assumed, without substantial error, that the emitter-to-base impedances in the transistors 1 and 2 are negligible, and that the base currents are negligible.

The current flowing into emitter 1e is the difference between the current flowing through resistor 6 and the current flowing through resistor 5. This may be expressed by the following equation (assuming junction 9 to be at 0 volts):

$$I_{e1} = \frac{E_7}{R_6} + \frac{E_{e2}}{R_5} \tag{1}$$

Differentiating (1)

$$dI_{e1} = d\left(\frac{E_{e2}}{R_5}\right) = \frac{1}{R_5}(dE_{e2}) \tag{2}$$

The potential at emitter 2e is equal to the potential at the negative terminal of battery 8 plus the potential drop through resistor 44. (The potential drop between the emitter and base of transistor 2 is close to zero, and may be neglected.) This relationship may be expressed as $$E_{e2} = -E_8 + I_{e1}R_{44} \tag{3}$$

It is assumed that the current through base 2b is negligible. This assumption is justified since the input resistance of the grounded collector stage is approximately $$= R_5/1 - \alpha$$

which is much greater than $R_{44}$.

Differentiating (3), we get $$dE_{e2} = R_{44}dI_{e1} \tag{4}$$

Substituting (4) in (2), we get $$dI_{e1} = \frac{R_{44}}{R_5}(dI_{e1}) \tag{5}$$

which may be rewritten as $$\frac{dI_{e1}}{dI_{e1}} = \frac{R_{44}}{R_5} = B' \tag{6}$$

From Equation 6, it follows that if the resistance of resistor 44 is greater than resistor 5, (B' greater than 1), then the circuit will be unstable, and if the resistance of resistor 44 is less than the resistance of resistor 5, (B' less than 1), then the circuit will be stable. Applying this equation to the circuit of Fig. 1, that circuit is unstable when the impedance of the step function impedance means 4 is greater than that of resistor 5, and is stable when that impedance is less than the impedance of resistor 5.

Consider the load line 4a of Fig. 3, which is there superimposed upon a set of collector volt ampere characteristics, taken for constant emitter current, for the transistor 1 of Figs. 1 and 2, in the grounded base connection shown. The load line 4a has a step formation consisting of regions A, C, E, G where the resistance of the load is low, connected by regions B, D and F, where the resistance of the load is high. By choosing the resistance of resistor 5 properly, between these low and high values, the circuit of Fig. 2 may be made stable in the low resistance regions A, C, E and G and unstable in the high resistance regions B, D and F.

The step function impedance means 4 of Fig. 1 establishes a load on the transistor 1 which follows the line 4a of Fig. 3.

Referring to Fig. 3, it may be seen that section A of load line 4a intersects the Vc axis at $E_{12}$, which (neglecting the forward drop across diode 11) is the potential of the negative terminal of battery 12. Section C of load line 4a, if extended along the dotted line until it intersected the Vc axis, would intersect it at $E_{17}$, which is the potential of the negative terminal of battery 17 in Fig. 1. Similarly, section E extended would intersect the same axis at $E_{20}$ and section G extended at $E_{22}$.

The operation of the circuit of Fig. 1 will now be considered as the potential at collector 1c varies from a value of $E_{12}$ to $E_{22}$, with reference to Fig. 3.

Battery 12 and diode 11 form a clamp for limiting the negative swing of the potential of collector 1c. If collector 1c tends to go to a more negative potential, then diode 11 becomes biased forwardly, and battery 12 is effective to clamp the potential of collector 1c at $E_{12}$.

The load on collector 1c is then only the low forward impedance of the diode 11, as indicated by the nearly vertical slope of section A of the load line 4a.

Consider the conditions now existing in the branch circuit including diodes 15 and 16, battery 17 and resistor 23. Referring to diode 16, it may be seen that its cathode is connected through resistor 23 to the negative terminal of battery 14, which is considerably more negative than the negative terminal of battery 17. Diode 16 is therefore forwardly biased, and junction 24 is at substantially the potential of the negative terminal of battery 17. Collector 1c is at a potential substantially more negative than the negative potential of battery 17. Diode 15 is therefore reversely biased, and no current flows through it from collector 1c.

As the potential of collector 1c increases from the value $E_{12}$, diode 11 becomes biased in the reverse direction. This change takes place quickly, during a change in the collector potential from $E_{12}$ to a value equal to the sum of $E_{12}$ and the forward potential drop across diode 11, during which transistor 1 is operating in the stable region A of Fig. 3. As the collector potential continues to increase, the diode 11 becomes reverse biased, and it is effectively removed as a load on collector 1c. This takes place at collector potential $E_A$, and the load on collector 1c thereupon becomes the impedance of resistor 13, which is very high as compared to the forward impedance of diode 11. This high impedance is illustrated by the nearly horizontal slope of section B of the load line 4a.

The section B defines an unstable region through which the circuit quickly passes. If the collector potential is increasing, it passes quickly from $E_A$ to $E_{17}$. At that potential, diode 15 becomes forwardly biased, and starts to conduct current.

For low values of current flow through diode 15, the junction 24 may be considered as a point of fixed potential. Within that range of low current values, an increase in current flow through diode 15 is accompanied by a decrease in current flow through diode 16. Resistor 23 and battery 14 then operate as a substantially constant current drain.

That range of low current values corresponds to the stable region C of Fig. 3, and to a range of collector potentials between $E_{17}$ and $E_c$. The effective incremental load on collector 1c in that region is only the forward impedance of diode 15, which is represented in Fig. 3 by the nearly vertical slope of section C.

As the potential of collector 1c increases to $E_c$, the current flow through diode 15 equals that originally supplied through diode 16, and, when the collector potential increases beyond that value, resistor 23 is added as a load to collector 1c, in parallel with resistor 13.

The impedance load on the collector 1c, is then relatively high, as shown by the nearly horizontal slope of the section D of load line 4a. (Note that the slope of section D is slightly greater than the slope of section B, because of the reduction of the load impedance by the addition of resistor 23 in parallel with resistor 13. This difference in slope is exaggerated in the drawing.) When the collector potential reaches the value $E_{20}$, the circuit enters another stable region E, where the only effective load is the forward impedance of diode 18. When the collector potential reaches the value $E_E$, resistor 25 is added as a load in parallel with resistors 13 and 23 and the circuit operates in the unstable region F. When the collector potential reaches the value $E_{22}$, the diode 21 is biased forwardly, and it effectively shunts the other load impedances and becomes the only effective load impedance on collector 1c so that the circuit operates in the stable region G, with the collector potential clamped at the value $E_{22}$.

The operating potentials of the various steps in a multistable circuit will normally be selected near the center of the stable regions A, C, E or G. It may be assumed, for the purposes of the present description, that these potentials are equally spaced. These potentials will hereinafter be identified as $E_A$, $E_C$, $E_E$ and $E_G$.

In the circuit of Fig. 1, the input gate 45, including the transistor 3, operates to shift the multistable circuit from one stable state to the next upon receipt of a succession of input signals. The impedances of the resistors 26, 27 and 28 are selected so that the potential of junction 29 is always one step more positive than the potential of emitter 2e, which is substantially the same as the potential of base 2b, and hence of collector 1c. For example, if base 2b is at $E_A$, then junction 29 is at $E_C$. At the same time, junction 31 is substantially one volt more positive than junction 29. Since junction 31 is connected to the base 3b, and junction 29 is connected to emitter 3e, the base is more positive than the emitter, and the transistor 3 is cut off. Upon the receipt of a negative input signal of 2.5 volts, through capacitor 33 to base 3b, the small (1 volt) positive bias of base 3b is overcome, transistor 3 becomes conductive, and the potential at emitter 3e is conducted through wire 35 to base 2b and collector 1c. Base 2b and collector 1c are thereby shifted suddenly one potential step in a positive sense, for example, from $E_A$ to $E_C$. This change in potential also appears at emitter 2e, with a resultant decreased current flow through resistor 5. Battery 7 produces a substantially constant current flow through resistor 6 (junction 9 being always substantially at ground potential), which current flow divides between emitters 1e and 2e. Consequently, when the current flow through resistor 5 decreases, there is a corresponding increase of current flow through emitter 1e, so that the collector 1c becomes stably established at a new potential, i.e., where current line $I_e=3$ crosses load line 4a.

The current flow through emitter 1e when collector 1c (and hence emitter 2e) is at its lowest potential is determined by the resistances of resistors 5 and 6 and the potential of battery 7. These values should be chosen so that the constant emitter current line in Fig. 3 for that value of emitter current intersects the load line 4a near the middle of section A, e.g., as the line $I_e=1$ ma. does in Fig. 3. The voltage steps in the load line are determined by the several potentials of batteries 14, 17, 20 and 22, and the current steps are determined by the relationship:

$$\frac{\text{voltage step}}{R_5} = \text{current step}$$

The time constant of the input circuit of transistor 3 is lower than the time constant of the voltage divider including resistors 26, 27 and 28, so that the negative input signal disappears by the time the junctions 29 and 31 are established at their new potential values. Consequently, transistor 3 is cut off between successive input signals.

The output gate, including diode 36, resistor 37 and battery 38 is set to produce an output signal whenever the collector 1c reaches its highest stable output potential, in this case $E_G$. The battery 38 is effective when the emitter 2e is below that ouput potential to bias the diode 36 reversely so that output terminal 39 is substantially at the negative potential of battery 38, which may be, for example −4 volts. When the emitter 2e reaches the potential of the highest stable state, then diode 36 becomes biased positively and the potential at output terminal 39 suddenly increases to that more positive value, which may be −1 volt.

FIG. 4

The circuit illustrated in this figure is based on the circuit of Fig. 1, but it has been modified to provide a complete decimal counter. Those circuit elements in Fig. 4 which are the same as their counterparts in Fig. 1 have been given the same reference characters.

The output gate 48 of Fig. 4 produces a signal on the tenth input signal. An automatic reset gate 50 is provided through which the circuit is reset to zero count each time a ten count output signal is produced.

The step function impedance network which functions as a load on transistor 1 is modified in the circuit of Fig. 4 by providing eight diode controlled load resistors in place of the two such resistors in Fig. 1, so that the circuit has a total of ten stable output states. Also, an arrangement is provided for supplying bias potentials for the diode controlled branches from a single battery 53, which also serves as a biasing battery for collector 2c of transistor 2.

Battery 53 supplies electrical energy to a voltage divider including ten resistors in series, numbered consecutively from 54 to 64.

Ten branch circuits are connected between collector 1c and ten points spaced along the voltage divider. The first of these branch circuits includes a diode 65 connected between collector 1c and the common junction of resistors 54 and 55 in the voltage divider, and a resistor 66 connected between collector 1c and the negative terminal of battery 14. Each of the next eight branch circuits includes oppositely poled diodes 67 and 68 connected between collector 1c and appropriate points along the voltage divider. Each pair of diodes 67 and 68 has a common terminal 69 connected through a resistor 70 to the negative terminal of battery 14. The tenth branch circuit includes a diode 71, connected to the common junction of resistors 63 and 64 of the voltage divider.

Diode 65 is a clamping diode establishing the most negative potential of collector 1c and diode 71 establishes the most positive potential of collector 1c. Load resistor 66 corresponds generally to resistor 13 of Fig. 1.

A manual zero reset gate 87 is connected to wire 10, and includes a capacitor 78, a diode 79, a battery 80 and a switch 81. When switch 81 is closed, the emitter 1e is set at a negative potential, and transistor 1 is completely cut off, so that its collector 1c swings to the negative potential established by the clamping diode 65.

While the gate operated by switch 81 has been described as a manual zero reset gate, and switch 81 has been described as a manually operable switch, it should be obvious to those skilled in the art that any mechanically equivalent automatic means may be substituted for the switch 81 to actuate the gate as required, in order to establish the counter at its zero count condition.

The signal generator 34 is shown in Fig. 4 as including a transistor 46 having an emitter electrode 46e, a base electrode 46b and a collector electrode 46c. Base 46b is connected to ground through a resistor 47 and is connected through a capacitor 49 to a signal input terminal 51. Collector 46c is connected to ground through a battery 72. Emitter 46e is connected through a load resistor 74 and a battery 75 to ground. Emitter 46e is connected through a resistor 76 and a wire 77 to capacitor 33 and thence to the base 3b of emitter 3e. The stage including transistor 46 is an emitter-follower stage of the type described in the copending application of George D. Bruce, et al. #459,382, filed September 30, 1954. The emitter-follower circuit reproduces the input signals with substantially greater current and with lower output impedance.

The automatic reset gate 50 includes a diode 201 having its cathode connected to wire 77, and a resistor 202 connected between the anode of diode 201 and the emitter 2e of transistor 2. The anode of diode 201 is also connected through a capacitor 203 to the emitter 1e of transistor 1.

OPERATION OF FIG. 4

Each input pulse received through the count-up input gate 45 switches the transistor 1 from one stable output condition to the stable output condition having the next higher potential. A series of nine input pulses at the gate 45 is required to shift the circuit from its lowest or zero counting level to its highest or nine counting level. When the potential at collector 1c reaches the nine counting level, an output signal is produced at the nine count output gate 48.

The circuit advances up one step, i.e., the potential of collector 1c and hence of emitter 2e changes one step in a positive direction, in response to each negative going input pulse received at input terminal 51. The positive going edge of the pulse will not affect the circuit, so that either peaked pulses as illustrated graphically in the drawing or square wave pulses may be used. After the ninth input pulse, the potential of emitter 2e is increased to a point where diode 201 is forwardly biased. The tenth input pulse, being repeated by the emitter-follower including the transistor 46, transmits a negative potential through diode 201 and capacitor 203 to emitter 1e, pulling the emitter 1e negative and cutting off the transistor 1, so that collector 1c is reset to its most negative potential.

FIG. 5

This figure illustrates a zero reset gate which may be used in place of the zero reset gate 87 of Fig. 4. This gate is connected to wire 10 and consists simply of a switch 204 and a battery 205 having its positive terminal grounded and its negative terminal connected to switch 204.

When switch 204 is closed, emitter 1e is negatively biased and transistor 1 is cut off, so that the emitter 1c is switched to its zero count condition.

FIG. 6

This figure illustrates a simplified signal input circuit which may be used in place of the input gate 45 of Fig. 1 or Fig. 4. This input gate includes a resistor 83 and a parallel diode 84 having its cathode connected to wire 73 and thence to collector 1c. The anode of diode 84 is connected through a capacitor 85 to ground. The anode of diode 84 is also connected through a capacitor 86, and a manual switch 88 to the positive terminal of a battery 89, whose negative terminal is grounded.

Closing of switch 88 sends a positive impulse through diode 84 to collector 1c. If this positive impulse is properly proportioned with respect to the voltage steps in the multistable network, each voltage impulse will step the network up from one step to the next higher positive step. It should readily be understood that the manual switch 88 may be replaced by any other equivalent mechanism for completing the circuit between battery 89 and capacitor 86.

FIG. 7

This figure illustrates a considerably more complex unit input gate arrangement which may be applied either to the circuit of Fig. 1 or the circuit of Fig. 4. Those elements in Fig. 4 which corresponds to elements in Fig. 1 have been given the same reference numerals. The transistor 3 of Fig. 1 and its related circuit elements are not used in the circuit of Fig. 7. A resistor 206 is connected in series between collector 1c and base 2b, and a capacitor 207 is connected between base 2b and ground. Emitter 1e is connected to a series circuit leading to an input terminal 211 and including a resistor 208, a diode 209, and a capacitor 210. The anode of diode 209 is connected through a resistor 211 to ground.

When a positive going input signal potential $E_{in}$ is applied to input terminal 211, then the input current $I_{in}$ flowing through resistor 208 to emitter 1e may be expressed as $$I_{in} = \frac{E_{in}}{R_{208}} e^{-\frac{T}{R_{208}C_{210}}} \qquad (7)$$

Where:

$R_{208}$ is the resistance of resistor 208, and
$C_{210}$ is the capacitance of capacitor 210, and
T represents the time after the application of the input potential $E_{in}$.

It is desired to have the collector current $I_c$ produced in response to an input current $I_{in}$ equal to the sum of the step current for the step function network plus the charging current required for capacitor 207 (as in the case of Fig. 1, it is assumed that the emitter-to-base impedances of the transistors 1 and 2 are negligible, and that the base currents are negligible. Consequently, the current flow through resistor 206 may be neglected except for the charging current for capacitor 207). Expressing this desired relationship mathematically, $$I_c = \frac{E_c}{R_x} + \frac{E_s}{R_{206}} e^{-\frac{T}{R_{206}C_{207}}} \qquad (8)$$

Where $E_s$ is one potential step of the step function network, $R_x$ is one impedance step of that network, $R_{206}$ is the resistance of resistor 206 and $C_{207}$ is the capacitance of capacitor 207. The first term on the right-hand side of this equation is the step current and the second term is the charging current for capacitor 207.

The potential $E_{fb}$ at the emitter 2e (as in Fig. 1, it is assumed that junction 9 is constantly at ground potential) may be expressed as $$E_{fb} = E + E_s\left(1 - e^{-\frac{T}{R_{206}C_{207}}}\right) \qquad (9)$$

Where E is the potential at collector 1c before the triggering current impulse is received.

Balancing the currents at junction 9, it may be stated that $$I_{fb} = \frac{E_7}{R_6} + \frac{E_{fb}}{R_5} \qquad (10)$$

where $I_{fb}$ is the current through wire 10.

Substituting Equation 9 in Equation 10, we get $$I_{fb} = \frac{E_7}{R_6} + \frac{E}{R_5} + \frac{E_s}{R_5}\left(1 - e^{-\frac{T}{R_{206}C_{207}}}\right) \qquad (11)$$

Balancing the currents at the emitter 1e, we see that the emitter current $I_e$ is the sum of $I_{fb}$ and $I_{in}$. Expressing this relationship mathematically by adding Equations 7 and 11, we get $$I_e = \frac{E_{in}}{R_{208}} e^{-\frac{T}{R_{208}C_{210}}} + \frac{E_7}{R_6} + \frac{E}{R_5} + \frac{E_s}{R_5}(1-e)^{-\frac{T}{R_{206}C_{207}}} \qquad (12)$$

In a junction transistor connected with its base grounded, $I_e = I_c$. Therefore, $$I_c = \frac{E_{in}}{R_{208}} e^{-\frac{T}{R_{208}C_{210}}} + \frac{E_7}{R_6} + \frac{E}{R_5} + \frac{E_s}{R_5}(1-e)^{-\frac{T}{R_{206}C_{207}}} \qquad (13)$$

Subtracting from the above equation for the collector current, the current required to charge capacitor 207 (see Equation 8 above), we get the current $I_L$ delivered to the step function network 4.

$$I_L = \frac{E_{in}}{R_{208}} e^{-\frac{T}{R_{208}C_{210}}} + \frac{E_7}{R_6} + \frac{E}{R_5} + \frac{E_s}{R_5}$$

$$-\frac{E_s}{R_5} e^{-\frac{T}{R_{206}C_{207}}} - \frac{E_s}{R_{206}} e^{-\frac{T}{R_{206}C_{207}}} \qquad (14)$$

Now, if the circuit constants are proportioned so that $$\frac{E_m}{R_{208}} e^{-\frac{T}{R_{208}C_{210}}} = \left(\frac{E_s}{R_5} + \frac{E_s}{R_{206}}\right) e^{-\frac{T}{R_{206}C_{207}}} \quad (15)$$

then, substituting Equation 15 in Equation 14, we get $$I_L = \frac{E_7}{R_6} + \frac{E}{R_5} + \frac{E_s}{R_5} \quad (16)$$

The current delivered to the load before the application of the input pulse $E_{in}$ was $$I_L = \frac{E_7}{R_6} + \frac{E}{R_5} \quad (17)$$

Comparing Equation 17 with Equation 16, it may be seen that a step of current will be delivered to the load in response to a step of voltage in the input 211 if the conditions of Equation 15 are satisfied. To satisfy that equation, we must make:

$$R_{208} C_{210} = R_{206} C_{207} \quad (18)$$

and also $$\frac{E_{in}}{R_{208}} = E_s\left(\frac{1}{R_5} + \frac{1}{R_{206}}\right) \quad (19)$$

Equations 18 and 19 can be readily met by properly proportioning the several resistors and capacitors involved.

FIG. 8

This figure illustrates a down-count input gate 213, which may be used in place of the up-count input gate 45 of Figs. 1 and 4.

Figure 8:
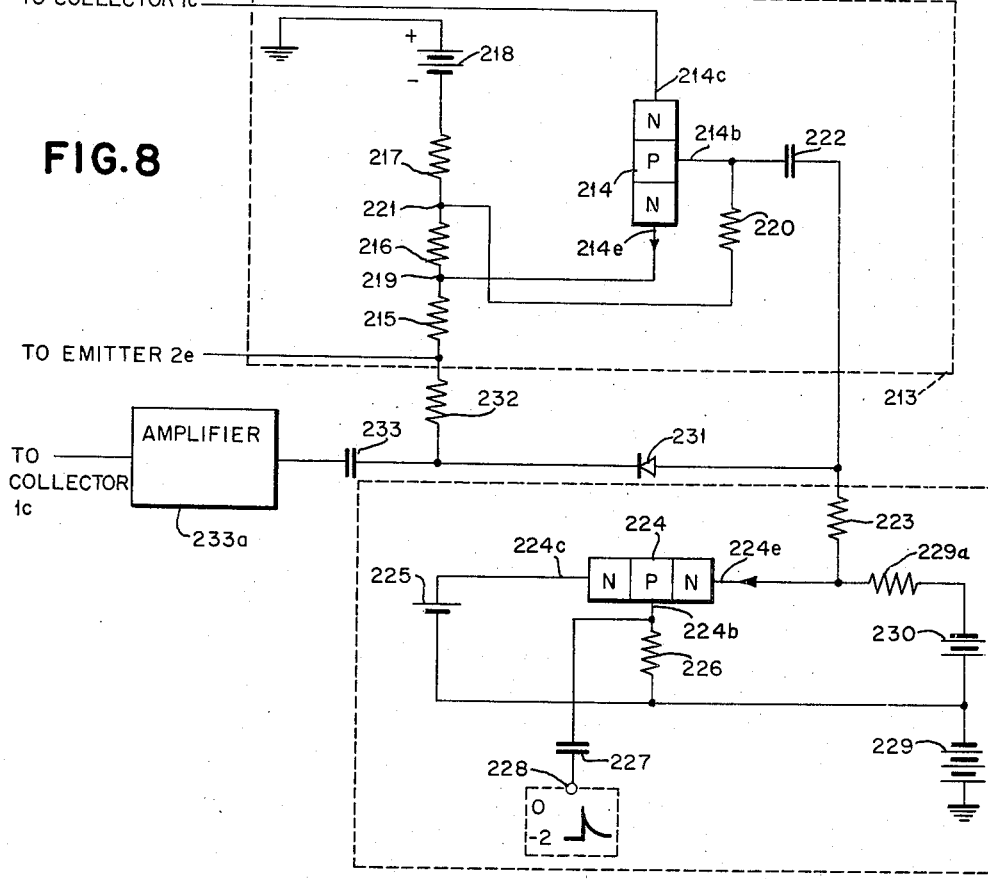
Fig. 8 is a fragmentary wiring diagram showing a count-down input gate, signal generator and reset gate which may be used with the circuit of Fig. 4.

The gate 213 includes an NPN junction transistor 214 having an emitter electrode 214e, a collector electrode 214c, and a base electrode 214b. Three resistors 215, 216 and 217, are connected in series with one another. The lower terminal of resistor 215, as it appears in Fig. 8, is connected to emitter 2e. The upper terminal of resistor 217 is connected to the negative terminal of a battery 218 whose positive terminal is grounded. Emitter 214e is connected to the common junction 219 between resistors 215 and 216. Base 214b is connected through a resistor 220 to the common junction 221 between resistors 216 and 217. Base 214b is also connected through a capacitor 222 and the resistor 223 to the emitter 224e of an NPN junction transistor 224. Transistor 224 has a collector electrode 224c and a base electrode 224b. Collector 224c is connected through a collector biasing battery 225 and a circuit biasing battery 229 to ground. Base electrode 224b is connected through a resistor 226 and battery 229 to ground, and through a capacitor 227 to an input terminal 228. Emitter 224e is connected through a resistor 229, a battery 230 and battery 229a to ground. The transistor 224 is connected in an emitter follower circuit generally similar to the emitter-follower circuit in Fig. 4 which includes the transistor 46. Emitter 224e is connected through resistor 223, a diode 231 and a resistor 232 to the emitter 2e of transistor 2. The common junction of resistor 232 and diode 231 is connected through a capacitor 233 and an amplifier 233a to the collector 1c of transistor 1.

Positive going signals are received at terminal 228 and are repeated with current amplification by the emitter-follower circuit including transistor 224. The direct potential level at emitter 224e is established by battery 229 at a value sufficiently negative so that diode 231 is biased reversely until the potential of emitter 2e reaches its next to lowest step. The input signals are effective at transistor 214 to step down the potential of collector 1c by one voltage step. When the emitter 2e reaches the next to the lowest step, its potential is sufficiently negative so that the diode 231 is then biased forwardly. Then when the next impulse is received at terminal 228, it is transmitted through diode 231, capacitor 233 and amplifier 233a to collector 1c. Amplifier 233a raises the signal potential sufficiently so that it is effective to swing the collector to its most positive potential, back to its highest or nine counting step, ready for further reduction in the registered count by successive impulses at input terminal 228.

FIG. 9

This figure illustrates a zero count output gate, which may be connected to emitter 2e. This gate includes a diode 234, a resistor 235 and a battery 236. One output terminal 237 is connected to the common junction of diode 234 and resistor 235. Another output terminal 238 is connected to ground. As long as the emitter 2e is above the potential of its lowest step, the diode 234 is biased reversely, and the output terminal 237 is at the potential of the negative terminal of battery 236. When emitter 2e reaches its lowest output potential then diode 234 is biased forwardly, and output terminal 237 remains at the potential of that lowest step. Consequently, an output signal is produced only when the count reaches its lowest step.

Figure 9:
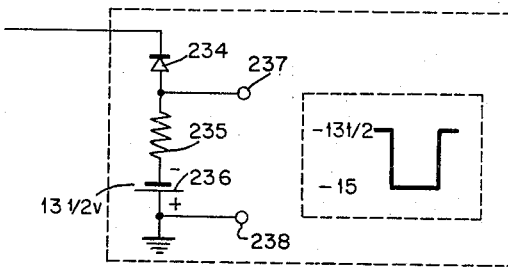
Fig. 9 is a fragmentary wiring diagram showing a down-count output gate which may be used with the circuit of Fig. 4.

If the circuits of Figs. 8 and 9 are substituted respectively for the input gate 45 and the output gate 48 of Fig. 4, then the decimal counter circuit of that figure is adapted for counting down or subtracting in response to each input signal, rather than counting up as in the circuit of Fig. 4. The substitution of these circuits of Figs. 8 and 9 in the input and output gates of Fig. 4 may be accomplished by suitable automatic or manual switching mechanism, so that a single multi-stable circuit may be used for both up and down counts.

FIG. 10

This figure illustrates an alternative arrangement for resetting the decimal counter to its nine count step. This circuit consists simply of a switch 239 connected between collector 1c and ground. When the switch 239 is closed, collector 1c is grounded, and the circuit is established on its nine count step. Suitable automatic mechanism may be used for operating switch 239 or equivalent electrical mechanism for grounding the collector 1c may be substituted. For example, such electrical mechanism may respond to the output signal through terminal 237 in Fig. 9.

FIG. 11

This figure illustrates a modification of the multistable circuit of Fig. 1, including a step function impedance network connected in a stage which is stable when the network impedance is high, and unstable when it is low. This modification includes a PNP junction transistor 90 having an emitter electrode 90e, a base electrode 90b and a collector electrode 90c, and an NPN junction transistor 91 having an emitter electrode 91e, a base electrode 91b, and a collector electrode 91c. A step function impedance network 92 is connected between a terminal 94 connected to the emitter 90e and the positive terminal of a load battery 93, whose negative terminal is grounded.

The step function impedance load 92 differs from the step function impedance 4 of Fig. 1 in that the polarities of the diodes are reversed. Note also that the polarity of battery 93 is reversed from that of battery 14 in Fig. 1.

The step function impedance 92 is shown as having two diode branches, and a resistor 97 connected between emitter 90e and positive terminal of battery 93. Each branch comprises a resistor 98, and a pair of oppositely poled diodes 99 and 100 having a common junction 101. The resistor 98 in each case is connected between the common junction 101 and the positive terminal of battery 93. Each of these branches includes a biasing battery, respectively indicated by the reference numerals 102 and 103. These batteries have terminal potentials differing from each other in steps, in a manner similar to the batteries 12, 17, 20 and 22 of Fig. 1.

Collector 90c is connected directly to base 91b and also through a load resistor 106 and a battery 107 to ground. Emitter 91e is connected through a resistor 108 and a battery 109 to ground. Collector 91c is connected through a feedback line 110 to base 90b and is also connected through a resistor 111 to the positive terminal of a battery 96.

FIG. 11—OPERATION

The circuit of Fig. 11 differs from the circuit of Figs. 1 and 4 principally in that the stable regions of the load line are the high resistance regions of that line, whereas the unstable regions are the low resistance regions. In this respect, the operation of the circuit of Fig. 11 is the opposite of the operation of the circuits of Figs. 1 and 4.

In the following discussion, it is assumed that the currents which flow through the bases of the two transistors are negligible, and that the emitter-to-base voltage drops are substantially zero.

For a given increment of input voltage at the base 90b of transistor 90, there is produced a corresponding increment of feedback voltage at collector 91c of transistor 91. If the ratio of the increment of feedback voltage to the ratio of the input voltage is greater than 1, the circuit is unstable. If the ratio is less than 1, the circuit is stable.

The current $I_1$ flowing from battery 93 through the load 92 to emitter 90e may be expressed as follows:

$$I_1 = \frac{E_1 - E_0}{R_0} \quad (20)$$

Where $E_1$ is the potential at the positive terminal of battery 93, $E_0$ is the potential at the base 90b (assumed equal to potential at emitter 90e), and $R_0$ is the impedance of network 92.

The potential $E_4$ at the collector 90c may be expressed in terms of the potential $E_2$ at the positive terminal of battery 107 and the potential drop across resistor 106:

$$E_4 = -E_2 + I_1 R_{106} \quad (21)$$

Substituting (20) in (21):

$$E_4 = -E_2 + \frac{(E_1 - E_0)}{R_0} R_{106} \quad (22)$$

The current flow $I_2$ through the emitter 91e may be expressed in terms of the potential drop across resistor 108 and the resistance of that resistor as follows:

$$I_2 = \frac{E_4 - E_3}{R_{108}} \quad (23)$$

Where $E_3$ is the potential of the negative terminal of battery 109.

Substituting (22) in (23), we get:

$$I_2 = \frac{-E_2}{R_{108}} + \frac{(E_1 - E_0)}{R_0 R_{108}} R_{106} - \frac{E_3}{R_{108}} \quad (24)$$

The feedback potential $E_5$ may be expressed in terms of the potential $E_6$ of battery 96 and the potential drop across resistor 111, as follows:

$$E_5 = E_6 - I_2 R_{111} \quad (25)$$

Substituting (24) in (25), we get:

$$E_5 = E_6 + \frac{E_2 R_{111}}{R_{108}} - \frac{E_1 R_{106} R_{111}}{R_0 R_{108}} + \frac{E_0 R_{106} R_{111}}{R_0 R_{108}} + \frac{E_3 R_{111}}{R_{108}} \quad (26)$$

Differentiating (26) with respect to the input potential $E_0$, we get:

$$\frac{\gamma E_5}{\gamma E_0} = \frac{R_{106} R_{111}}{R_0 R_{108}} \quad (27)$$

From (27) it follows that the circuit is unstable if $R_0$ is less than $$\frac{R_{106} R_{111}}{R_{108}}$$

so that $$\frac{\gamma E_5}{\gamma E_0}$$

is greater than 1, and that the circuit is stable if $R_0$ is greater than $$\frac{R_{106} R_{111}}{R_{108}}$$

so that $$\frac{\gamma E_5}{\gamma E_0}$$

is less than 1.

FIG. 12

This figure illustrates still another circuit configuration which may be used with a step function impedance load in a manner generally similar to Fig. 11. This circuit includes a PNP junction transistor 113, having an emitter electrode 113e, a base electrode 113b, and a collector electrode 113c, and a PNP junction transistor 114, having an emitter electrode 114e, a base electrode 114b and a collector electrode 114c.

Emitter 113e is connected to a terminal 94 which may be the same as terminal 94 of Fig. 11 and may be connected to the same step function impedance means 92. Collector electrode 113c is connected through a load resistor 115 and a battery 116 to ground. Collector 113c is also connected directly to base 114b. Emitter 114e is connected through a resistor 117 to ground. Collector 114c is connected through a load transistor 118 and a battery 119 to ground and to a load branch including in series resistors 120 and 121 and a battery 122. The common junction 123 of resistors 120 and 121 is connected through a feed-back line 124 to base 113b.

FIG. 13

Figure 13:
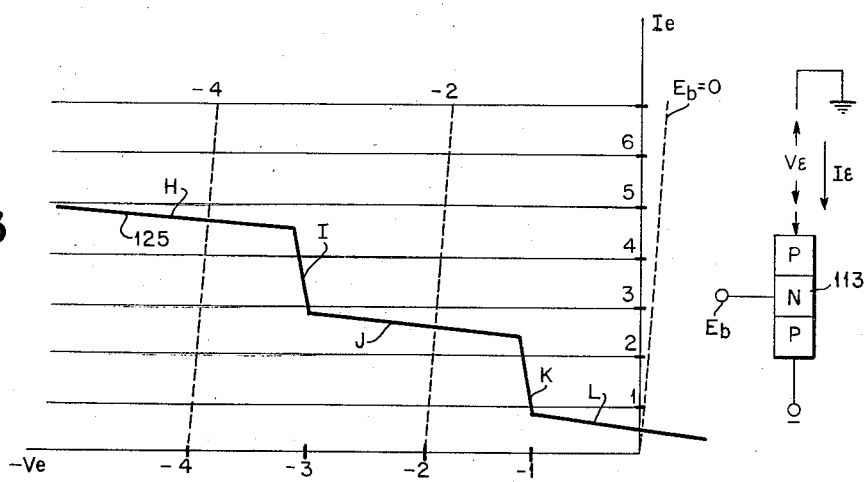
Fig. 13 is a graphical illustration corresponding generally to Fig. 3, but relating to the circuit of Fig. 12.

This figure illustrates graphically the operation of the circuit of Fig. 12. It shows a family of volt ampere characteristics for the emitter of transistor 113 of Fig. 12, for different values of base potential $E_b$. The various parameters involved are identified in the schematic diagram at the right-hand side of Fig. 13. On this family of characteristics there is superimposed a step function load line generally indicated by the reference numeral 125, and consisting of alternating low and high impedance regions H, I, J, K, L.

Consider the circuit of Fig. 12, when the potential of emitter 113e is at its most positive value, which is determined by the intersection of region L of load line 125 with the current axis. The load on emitter 90e is then the resistance of resistor 97.

Considering the first of the branch circuits in the step function impedance means 92, at this time, the anode of diode 100, at junction 101 is connected through resistor 98 to the positive terminal of battery 93. The cathode of diode 100 is, for example, at the potential of the negative terminal of battery 102. Diode 100 is therefore forwardly biased, and junction 101 is substantially the potential of the negative terminal of battery 102. The cathode of diode 99 is at the potential of emitter 90e, which is at this point somewhat more positive than the negative terminal of battery 102. Diode 99 is therefore reversely biased, and the only load on emitter 90e is resistor 97. As the potential of emitter 90e changes in a negative direction, it becomes equal to the potential of the negative terminal of battery 102, whereupon diode 99 becomes forwardly biased and the first resistor 98 is added as a load to the emitter 90e. This change occurs during the unstable region K of load line 125, and shifts the operating point of the circuit to the stable region J. As the emitter potential 90e becomes more negative, it passes at region I the potential of the battery 103. At that potential, another load resistor 98 is added, in parallel with the resistor 97, and the circuit operates in the stable region H.

FIG. 14

This figure is a modification of Fig. 1, in which all the potentials are supplied from a single battery 126. This circuit thereby avoids errors which might be encountered in the circuit of Fig. 1 due to the unequal changes of the various battery potentials with time.

Figure 14:
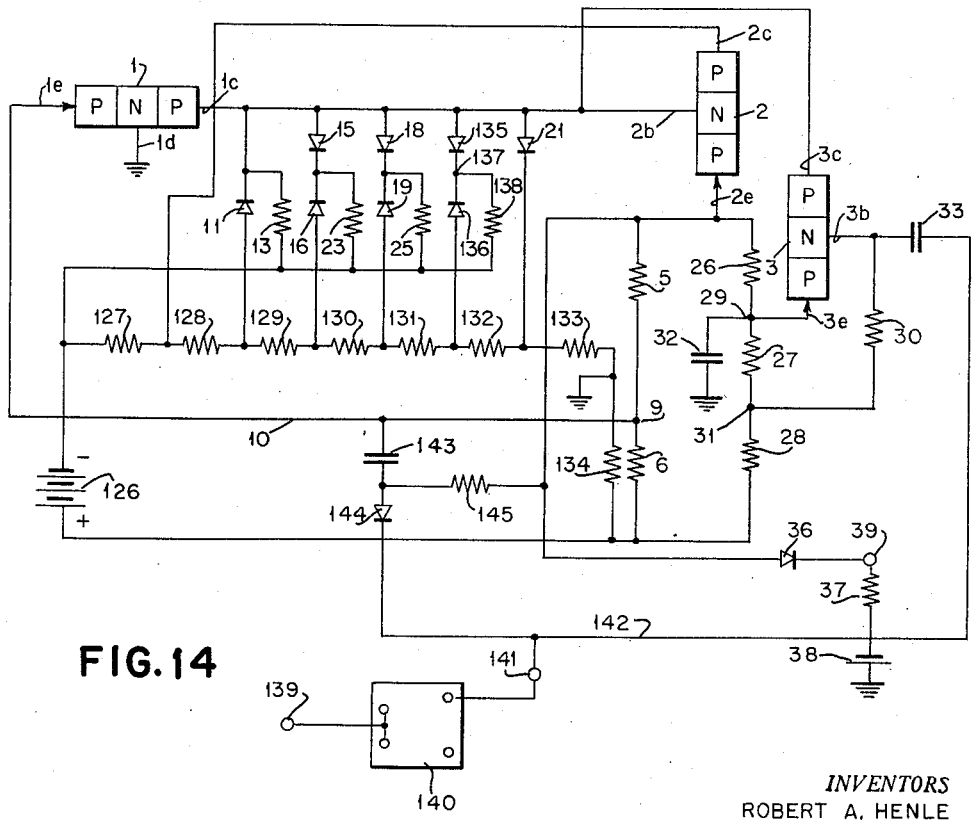
Fig. 14 is a wiring diagram of a modified form of counter circuit embodying the invention, and operated from a single source of electrical energy.

Those circuit elements in Fig. 14 which correspond to their counterparts in Fig. 1 have been given the same reference numerals and will not be further described.

The battery 126 has connected across it a voltage divider including in series 8 resistors, numbered consecutively from 127 to 134. The common terminal of resistors 133 and 134 is grounded.

The step function impedance of this figure has an additional branch circuit as compared to that of Fig. 1, such additional branch circuit including diodes 135 and 136 oppositely poled with respect to a common junction 137, and a resistor 138.

An arrangement is shown for using the circuit of Fig. 14 as a decade counter. For this purpose, the input pulses to be counted are applied at an input terminal 139 from which they pass to a binary trigger circuit 140, which may, for example, be of the type described in the copending application of Robert A. Henle et al., Serial No. 459,381, filed September 30, 1954. This trigger circuit produces an output pulse for each two input pulses. These output pulses are transmitted to an input terminal 141 connected to a wire 142 which leads through capacitor 33 to the base 3b of the input gate of transistor 3. A reset gate is provided including a capacitor 143 and a diode 144 connected in series between wire 10 and wire 142, and a resistor 145 connected between the emitter 2e and common junction of diode 144 and capacitor 143.

A series of ten input signals at input terminal 139 will produce five input signals at terminal 141 which in turn will shift the transistor 1 through its five stable states.

On each input pulse, the binary trigger 140 shifts from one of its stable states to the other. In the arrangement illustrated, it will produce a positive going output signal on each odd numbered input pulse and a negative going signal on each even numbered input pulse. The input gate including transistor 3 responds only to negative going input signals.

Starting from the zero count condition of the transistor 1, the first negative input signal is received at base 3b at a time T2 when the negative going edge of the second input signal reaches input terminal 139. The transistor 1 advances through its five stable states at the negative going end of each even numbered input signal. On the eighth input signal, the potential of emitter 2e is sufficiently positive to bias the diode 144 forwardly, so that when the tenth input signal is received, the negative going signal at terminal 141 is transmitted through diode 144 and capacitor 143 and is effective to swing the emitter 1e negatively, by cutting off transistor 1 and resetting the collector 1c at its most negative or zero count potential.

FIGS. 15 AND 16

This circuit illustrates a multistable circuit generally similar to that of Fig. 1, using vacuum tubes as translating devices instead of transistors. The circuit includes a pentode 146 connected in a grounded grid amplifier stage and a triode 147 connected in a cathode follower stage. A step function impedance network 148 is connected as a load to the anode 146a of pentode 146.

The pentode 146 has a control grid 149 connected through a battery 150 to ground. The other grids of the pentode are connected in a conventional manner. The anode 146a of pentode 146 is connected through a wire 151 to the control electrode 152 of triode 147. The cathode of triode 147 is connected through two series resistors 153 and 154 to ground. The anode of triode 147 is connected to the positive terminal of a battery 155, whose negative terminal is grounded. The cathode of pentode 149 is connected through a wire 178 to the common terminal 179 of resistors 153 and 154.

The step function impedance network 148 includes five branches. One branch includes a diode 156 and a battery 157. A second branch includes oppositely poled diodes 158 and 159 having a common junction 160, and a resistor 161 connected between that junction and a positive terminal of battery 162. A battery 167 is connected between diode 159 and ground.

A third branch of the network 148 includes oppositely poled diodes 163 and 164 having a common junction 165, and a resistor 166 connected between the junction 165 and the positive terminal of battery 162. This branch also includes a battery 168 connected between diode 164 and ground. A fourth branch of the network 148 includes oppositely poled diodes 169 and 170 having a common junction 171, and a resistor 172 connected between junction 171 and the positive terminal of battery 162. A battery 173 is connected between diode 170 and ground.

The fifth branch of network 148 includes a junction 174, a diode 175 and a battery 176 connected in series between junction 174 and ground, and a resistor 177 connected between junction 174 and the positive terminal of battery 162.

The batteries 157, 167, 168, 173 and 176 have progressively larger potentials, and battery 162 has a potential substantially greater than any of the others.

Figure 15:
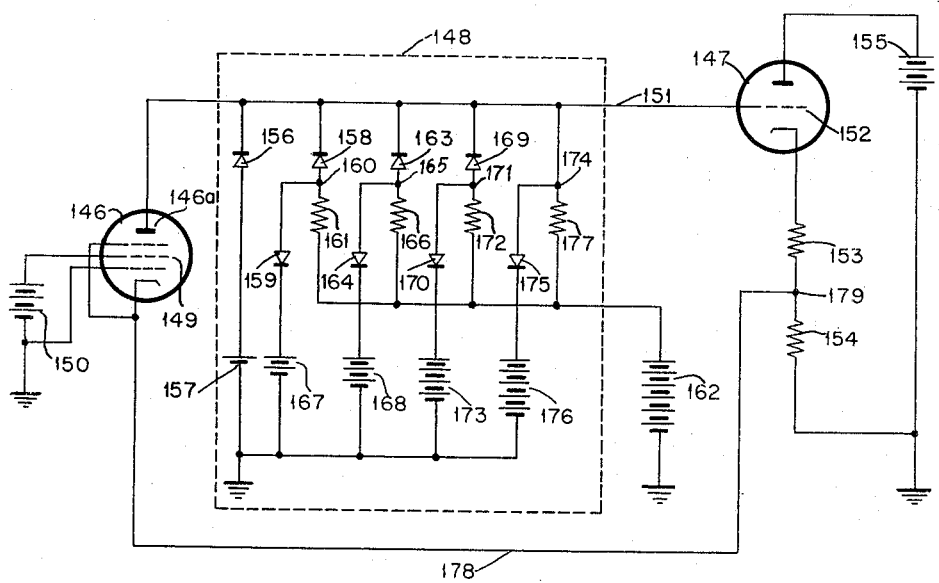
Fig. 15 is a wiring diagram of a multistable circuit embodying the invention, and employing vacuum tubes instead of transistors.
Figure 16:
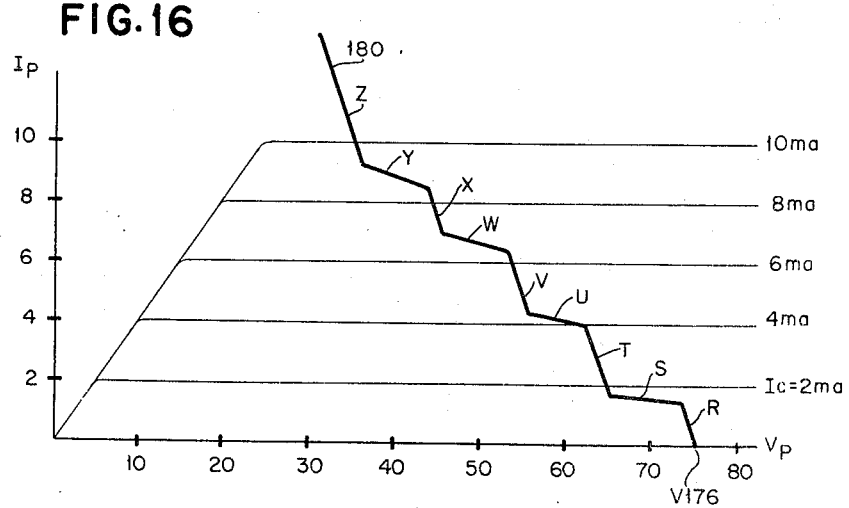
Fig. 16 is a graphical illustration of the operating characteristics of one of the vacuum tubes of Fig. 15, with a step function load line superimposed thereon.

The operation of the circuit of Fig. 15 may best be understood by reference to the graphical illustration of Fig. 16. Fig. 16 shows a family of output characteristics of the pentode 146 for different values of the cathode current $I_c$. In Fig. 16, the ordinates are anode currents $I_p$ and the abscissae are anode potentials $V_p$. On this family of characteristics is superimposed a load line 180 determined by the impedance of the step function network 148.

Figure 10:
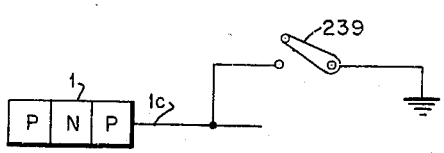
Fig. 10 is a fragmentary wiring diagram showing an alternative reset gate which may be used with the circuit of Fig. 4.

The diode 175 and battery 176 of Fig. 15 serve as a clamp to limit the maximum positive potential of anode 146a. If the potential of anode 146a tends to go higher than the potential of the positive terminal of battery 176, then diode 175 becomes biased forwardly, and prevents such a rise in the anode potential. This particular value of anode potential is indicated at $V_{176}$ on Fig. 10.

As the potential of anode 146a decreases from this maximum value, the bias across diode 175 becomes reversed. During that reversal, the circuit operates in the stable region R. After the reversal is completed, the resistor 177 is effectively connected as a load to the anode 146a, and the circuit operates in the unstable region S.

Consider now the conditions in the fourth branch of the network 148, which branch includes the diodes 169 and 170. Junction 171 is connected through resistor 172 to the positive terminal of battery 162, which is substantially higher than the potential of battery 173. Diode 170 is therefore biased forwardly, with the result that junction 171 is substantially at the potential of the positive terminal of battery 173. Wire 151 is at this time more positive than this potential, so that diode 169 is reversely biased, and this branch of the network is not effective as a load on the anode 146a.

If the potential of anode 146a and wire 151 decreases further, then at some region such as the stable region T of the load line 180, the bias across diode 169 reverses, whereupon resistor 172 is connected as a load to the anode 146a, the circuit then operates in the unstable region U.

In an analogous manner a continued decrease in the potential will cause the circuit to shift through the regions V, W, X, Y and Z of load line 180.

FIGS. 17 AND 18

This figure illustrates a modification of the circuit of Fig. 1, including a novel type of step function impedance network, generally indicated by the reference character 181. The network 181 employs silicon PN junction alloy diodes of the type described by G. L. Pearson and 181. The network 181 employs silicon PN junction Alloy Diodes," which appeared in vol. 40, No. 11 of the Proceedings of the Institute of Radio Engineers for November 1952, pages 1348 to 1351. Such diodes have a peculiar volt/ampere characteristic. Most crystal diodes, for example, germanium diodes, have a low impedance in one direction termed the forward direction and a high impedance to the flow of current in the reverse direction. In this silicon junction alloy diode the high impedance in the reverse direction persists only until the reverse potential applied exceeds a certain value commonly referred to as the Zener voltage or Zener potential. When the reverse potential exceeds this value, the impedance of the diode again drops to a very low value, being as low or lower than the forward impedance and in many cases being substantially zero.

In the network 181 there are connected in series between collector 1c and base 2b, three of these silicon junction diodes, numbered respectively 182, 183 and 184. Another silicon junction diode 185 is connected between base 2b and the negative terminal of a battery 186, whose opposite terminal is grounded.

A load resistor 187 is connected between the negative terminal of a battery 188 and the common junction 189 of collector 1c and the first silicon diode 182. Another load resistor 190 is connected between the negative terminal of battery 188 and the common junction 191 of the silicon diodes 182 and 183. Another load resistor 192 is connected between the negative terminal of battery 188 and the common junction 193 between silicon diodes 183 and 184. A fourth load resistor 194 is connected between the negative terminal of battery 188 and the common junction 195 between diode 184 and base 2b.

Figure 17:
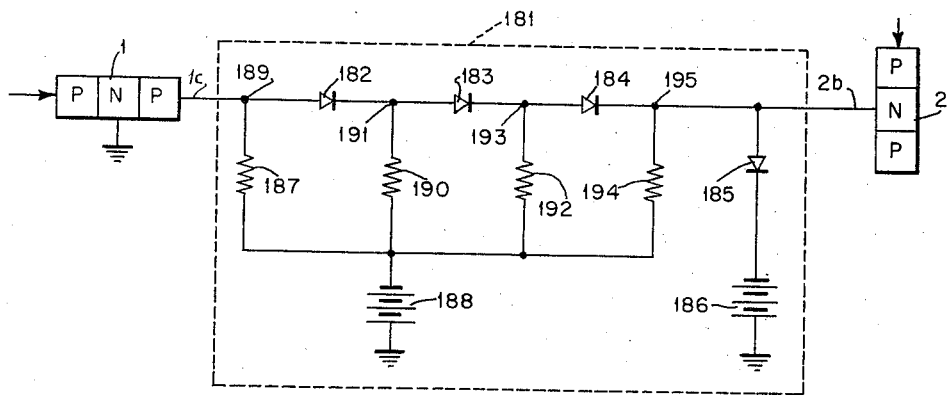
Fig. 17 is a wiring diagram of a portion of a counter similar to that of Fig. 1, but employing a modified form of step function impedance means.

The several diodes 182, 183, 184 and 185 all have the same Zener potential. The operation of the circuit of Fig. 17 may be summarized in the following table:

*Table I*

|          | Region | 182     | 183     | 184     | 185     |
|----------|--------|---------|---------|---------|---------|
| Stable   | 196a   | Zener   | Zener   | Zener   | Zener   |
| Unstable | 196b   | Reverse | do      | do      | Do.     |
| Stable   | 196c   | Forward | do      | do      | Do.     |
| Unstable | 196d   | do      | Reverse | do      | Do.     |
| Stable   | 196e   | do      | Forward | do      | Do.     |
| Unstable | 196f   | do      | do      | Reverse | Do.     |
| Stable   | 196g   | do      | do      | Forward | Do.     |
| Unstable | 196h   | do      | do      | do      | Reverse |
| Stable   | 196i   | do      | do      | do      | Forward |

Figure 18:
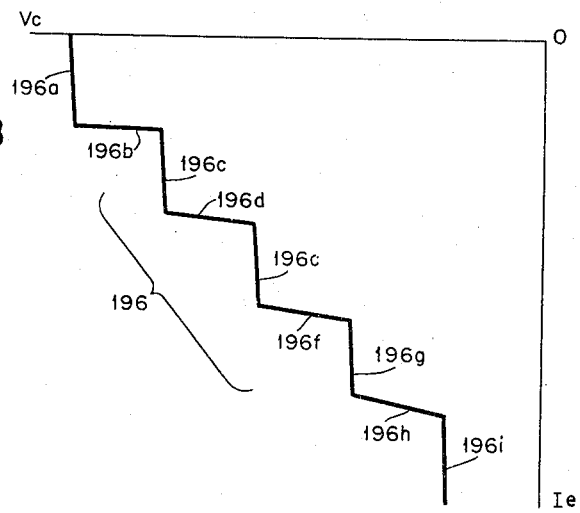
Fig. 18 is a graphical illustration similar to Fig. 3, but relating to the circuit of Fig. 17.

When any of the diodes 182, 183, 184 and 185 is forwardly biased or is reversely biased beyond its Zener potential, then its impedance is so small as to be negligible. In the region 196a of Fig. 18, the potential of collector 1c is sufficiently low that all the diodes are reversely biased beyond their Zener potential. As the potential of collector 1c increases in a positive sense, the potential across diode 182 decreases until it enters its reverse bias region. The load line 196 in Fig. 18 then enters the region 196b. This is an unstable region and the circuit passes through it quickly to region 196c, in which diode 182 becomes forwardly biased and the potential across it again drops to zero. This process is repeated for each of the diodes 182, 183, 184, as indicated by the table above. With regard to the diode 185, its cathode is at a fixed negative potential of 1 volt and it does not become positively biased until the collector 1c swings more positive than —1 volt.

FIG. 19

This figure illustrates a multistable circuit similar to that of Fig. 1, but differing in that it employs a single point contact transistor 197 having an emitter electrode 197e, a collector electrode 197c and a base electrode 197b.

Point contact transistors such as transistor 197 have a current amplification greater than 1. Consequently, a single transistor can provide sufficient output current for the necessary feedback. Conventional junction transistors such as the transistor 1 of Fig. 1 have a current amplification factor of approximately 1. Consequently, in view of that limitation, it is necessary when using such transistors to use a second transistor as an amplifier for the feedback as in the circuit of Fig. 1.

Any other equivalent translating device having sufficient high amplification characteristics may be used to provide a multistable circuit.

Figure 19:
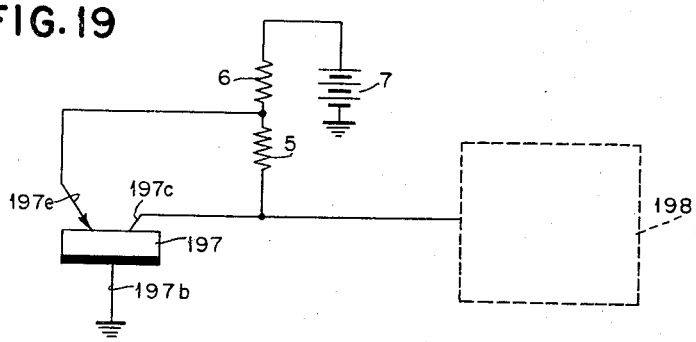
Fig. 19 is a wiring diagram of a modified form of multistable circuit employing a point contact transistor.

The load resistors 5 and 6 and the battery 7 may be the same in Fig. 19 as they are in Fig. 1. The step function impedance network is indicated diagrammatically at 198. The values of the circuit parameters in the circuit of Fig. 19 will have to be selected to match the impedance characteristics of the particular point contact transistor being used. For that reason, since present point contact transistors do not have readily reproducible characteristics, it is presently preferred to use a two-stage amplifier circuit with junction transistors, as in Fig. 1, rather than the simpler circuit of Fig. 19.

While the transistors in the circuit illustrated are PNP junction transistors, it will be readily understood that NPN transistors can be used alternatively, providing that all the polarities of the batteries are reversed, and other changes made in accordance with principles well understood in the art.

The following table shows by way of example particular values for the potentials of the various batteries and for the impedances of the various resistors and capacitors, in circuits which have been operated successfully. In some cases, the values are also shown in the drawing. These values are also set forth by way of example only, and the invention is not limited to them nor to any of them. The diodes are considered to have substantially no impedance in their forward direction and substantially infinite impedance in the reverse direction.

*Table II*

FIGS. 1 AND 2

| | |
|---|---|
| Resistor 5 | 1500 ohms. |
| Resistor 6 | 2000 ohms. |
| Battery 7 | 15 volts. |
| Battery 8 | 12 volts. |
| Battery 12 | 10 volts. |
| Resistor 13 | 51K ohms. |
| Battery 14 | 100 volts. |
| Battery 17 | 7 volts. |
| Battery 20 | 4 volts. |
| Battery 22 | 1 volt. |
| Resistor 23 | 51K ohms. |
| Resistor 25 | 51K ohms. |
| Resistor 26 | 1.5K ohms. |
| Resistor 26a | |
| Resistor 27 | 510 ohms. |
| Resistor 27a | |
| Resistor 28 | 7.5K ohms. |
| Resistor 28a | |
| Resistor 30 | 1K ohm. |
| Capacitor 32 | .01 mf. |
| Capacitor 33 | 1000 mmf. |
| Resistor 37 | 3K ohms. |
| Battery 38 | 4 volts. |
| Battery 53 | 15 volts. |
| Resistor 54 | 13 ohms. |
| Resistor 55 | 13 ohms. |
| Resistor 56 | 13 ohms. |
| Resistor 57 | 13 ohms. |
| Resistor 58 | 13 ohms. |
| Resistor 59 | 13 ohms. |
| Resistor 60 | 13 ohms. |
| Resistor 61 | 13 ohms. |
| Resistor 62 | 13 ohms. |
| Resistor 63 | 9 ohms. |

Table II—Continued

| Component | Value |
|---|---|
| Resistor 66 | 300K ohms. |
| Resistor 70 | 300K–330K ohms. |
| Resistor 72 | 1K ohm. |
| Capacitor 74 | 1000 mmf. |
| Resistor 76 | 3K ohms. |
| Battery 77 | 12 volts. |
| Capacitor 78 | .01 mf. |
| Battery 80 | 5 volts. |
| Resistor 83 | 200K ohms. |
| Capacitor 85 | 400 mmf. |
| Capacitor 86 | 60 mmf. |
| Battery 89 | 5 volts. |

FIG. 4

| Component | Value |
|---|---|
| Resistor 5 | 1650 ohms. |
| Resistor 6 | 5.1K ohms. |
| Battery 7 | 50 volts. |
| Battery 8 | 15 volts. |
| Battery 14 | 300 volts. |
| Resistor 26 | 1.5K ohms. |
| Resistor 26a | 1.5K ohms. |
| Resistor 27 | 510 ohms. |
| Resistor 27a | 510 ohms. |
| Resistor 28 | 7.5K ohms. |
| Resistor 28a | 68K ohms. |
| Resistor 30 | 1K ohm. |
| Capacitor 32 | .01 mf. |

FIG. 11

| Component | Value |
|---|---|
| Battery 93 | 70 volts. |
| Battery 96 | 2.5 volts. |
| Resistor 97 | 142K ohms. |
| Resistor 98 | 35K ohms. |
| Battery 102 | 1 volt. |
| Battery 103 | 3 volts. |
| Resistor 106 | 1K ohms. |
| Battery 107 | 10 volts. |
| Resistor 108 | 3K ohms. |
| Battery 109 | 12 volts. |
| Resistor 111 | 2K ohms. |

FIG. 12

| Component | Value |
|---|---|
| Resistor 115 | 1K ohm. |
| Battery 116 | 10 volts. |
| Resistor 117 | 2K ohms. |
| Resistor 118 | 3.3K ohms. |
| Battery 119 | 72 volts. |
| Resistor 120 | 1K ohm. |
| Resistor 121 | 5.1K ohms. |
| Battery 122 | 70 volts. |

FIG. 14

| Component | Value |
|---|---|
| Resistor 5 | 1.4K ohms. |
| Resistor 6 | 43K ohms. |
| Resistor 26 | 15K ohms. |
| Resistor 27 | 510 ohms. |
| Resistor 28 | 33K ohms. |
| Resistor 30 | 1K ohm. |
| Capacitor 32 | .01 mf. |
| Capacitor 33 | 1000 mfd. |
| Battery 126 | 200 volts. |
| Resistor 127 | 3.4K ohms. |
| Resistor 128 | 10 ohms. |
| Resistor 129 | 30 ohms. |
| Resistor 130 | 39 ohms. |
| Resistor 131 | 47 ohms. |
| Resistor 132 | 47 ohms. |
| Resistor 133 | 10 ohms. |
| Resistor 134 | 610 ohms. |
| Resistor 138 | 120K ohms. |
| Capacitor 143 | .005 mfd. |
| Resistor 145 | 5.1K ohms. |

FIG. 15

| Component | Value |
|---|---|
| Tube 146 | Tube 6AC7. |
| Tube 147 | 1/2 tube 12 AV7. |
| Battery 150 | 150 volts. |
| Resistor 153 | 3.7K ohms. |
| Resistor 154 | 10.5K ohms. |
| Battery 155 | 200 volts. |
| Battery 157 | 35 volts. |
| Resistor 161 | 140K ohms. |
| Battery 162 | 400 volts. |
| Resistor 166 | 170K ohms. |
| Battery 167 | 45 volts. |
| Battery 168 | 55 volts. |
| Resistor 172 | 140K ohms. |
| Battery 173 | 65 volts. |
| Battery 176 | 75 volts. |
| Resistor 177 | 230K ohms. |

FIG. 17

| Component | Value |
|---|---|
| Diode 182 | Zener voltage=3 volts. |
| Diode 183 | Zener voltage=3 volts. |
| Diode 184 | Zener voltage=3 volts. |
| Diode 185 | Zener voltage=3 volts. |
| Battery 186 | 1 volt. |
| Resistor 187 | 51K ohms. |
| Resistor 190 | 51K ohms. |
| Resistor 192 | 51K ohms. |
| Resistor 194 | 51K ohms. |
| Battery 188 | 100 volts. |

What is claimed is:

1. A counter circuit comprising a multistable stage including a first translating device having an output electrode and an input electrode, a step function impedance network connected to said output electrode as a load, feedback means connected between said output electrode and said input electrode, said translating device, said network and said feedback means cooperating to establish said stage in any one of a series of stable states defined by predetermined output electrode potentials, the several states in the series being separated by predetermined substantially equal potential increments, within which increments the stage is unstable, and input gate means for stepping said stage through said series of states, comprising a voltage divider connected to said multistable stage and effective at each state of said stage to develop at a junction in said divider a potential substantially equal to the potential defining a next adjacent stable state in the series, a second translating device connected between said junction and the output electrode of said first translating device, means biasing said second translating device to a high impedance condition, and means for supplying to said second translating device a series of input pulses separated in time, each having a polarity and magnitude effective to switch said second device to a low impedance condition, said second translating device being thereupon effective to transfer said junction potential to said output electrode of said first device, thereby driving said stage from one stable state in said series to an adjacent one, so that the number of states through which the stage passes is a count of the number of input pulses.

2. A counter circuit as defined in claim 1, in which said voltage divider is effective to develop at said junction a potential defining the next higher potential state in the series, so that successive input pulses drive the multistable stage successively to states of increasing potential.

3. A counter circuit as defined in claim 2, including an output gate for producing an output signal when the multistable stage reaches its highest potential state, said output gate comprising a pair of output terminals, a source of electrical energy, a resistor connected in series with said source between said pair of output terminals, and a diode connected between one of said terminals and a point on said multistable stage subject to a potential varying with the state of said stage, means connecting the other of said output terminals to a common junction with said multistable stage, said source having a polarity and potential effective to bias said diode reversely except when the potential at said point corresponds to that of the highest stable state of the multistable stage, said stage being then effective to transmit a current through said diode and through said resistor and thereby to vary the potential of said one output terminal.

4. A counter circuit as defined in claim 3 including reset means effective on the next input pulse after the stage reaches its highest potential state to reset the stage at its lowest potential state, said reset means comprising a capacitor and a diode connected in series between the input electrode of said first translating device and said input pulse supply means, and a connection between the common terminal of said capacitor and diode and a point in said multistable stage having a potential effective to bias said diode reversely except at the highest stable state of the multistable stage.

5. A counter circuit comprising a multistable stage including a first translating device having an output electrode and an input electrode, a step function impedance network connected to said output electrode as a load, feedback means connected between said output electrode and said input electrode; said translating device, said network and said feedback means cooperating to establish said stage in any one of a series of stable states defined by predetermined potentials at one electrode of said device, the several states in the series being separated by predetermined, substantially equal, potential increments at said one electrode within which increments the stage is unstable, and input gate means for stepping said stage through said series of states, one at a time, comprising a source of potential having a value fixed in relation to the value of one of said increments, and means including said source for supplying to one electrode of said device a potential substantially equal to the potential defining one of the states adjacent in the series to the existing state, thereby driving said stage from said existing state to said adjacent state.

6. A counter circuit as defined in claim 5, including manually operable means for resetting said multistable stage at its lowest potential state.

7. A counter circuit as defined in claim 5, in which said potential supplying means is effective to supply a potential defining the state of next lower potential to the existing state.

8. A counter circuit as defined in claim 7, including means for producing an output signal when said multistable stage reaches its lowest potential state.

9. A counter circuit as defined in claim 8, including means operable upon production of said output signal to reset said multistable stage to its highest potential state.

10. A multistable circuit comprising a first transistor having an input electrode and an output electrode, a step function impedance network connected to said output electrode as a load, feedback means connected between said output electrode and said input electrode comprising a second transistor, means directly conductively coupling an input electrode of said second transistor to the output electrode of the first transistor and resistive means coupling the output electrode of the second transistor to the input electrode of the first transistor, said first transistor, said network and said feedback means cooperating to establish said stage in any one of a series of stable states defined by predetermined output electrode potentials, the several states in the series being separated by predetermined, substantially equal, potential increments, within which increments the stage is unstable.

11. A multistable circuit as defined in claim 10, including means connecting the base electrode of said first transistor to ground, and means connecting the collector electrode of the second transistor to ground.

12. A multistable circuit as defined in claim 10, in which said first transistor is a PNP junction transistor, having emitter, collector and base electrodes, said second transistor is an NPN junction transistor having emitter, collector and base electrodes, means directly conductively coupling the collector of the first transistor to the base of the second transistor, means directly conductively coupling the collector of the second transistor to the base of the first transistor, means connecting said step function impedance network to the emitter of the first transistor, and means connecting the emitter of the second transistor to ground.

13. A counter circuit comprising a multistable stage including a first transistor having an input electrode and an output electrode, a step function impedance network connected to said output electrode as a load, feedback means connected between said output electrode and said input electrode comprising a second transistor, means coupling an input electrode of said second transistor to the output electrode of the first transistor and means coupling the output electrode of the second transistor to the input electrode of the first transistor; said first transistor, said network and said feedback means cooperating to establish said stage in any one of a series of stable states defined by predetermined output electrode potentials, the several states in the series being separated by predetermined, substantially equal, potential increments, within which increments the stage is unstable, and input gate means for stepping said stage through said series of stable states, step by step, comprising a source of potential having a value fixed in relation to the value of one of said increments, and means including said source for supplying to said stage a potential substantially equal to the potential defining one of the states adjacent in the series to the existing state, thereby driving said stage from said existing state to said adjacent state.

14. A counter circuit as defined in claim 13, in which said input gate means comprises a voltage divider connected to said multistable stage and effective at each state of said stage to develop at a junction in said divider a potential substantially equal to the potential defining a next adjacent stable state in the series, a third transistor connected between said junction and the output electrode of said first transistor, means biasing said third transistor to a high impedance condition, and means for supplying to said third transistor a series of input pulses separated in time, each having a polarity and magnitude effective to switch said third transistor to a low impedance condition, said third transistor being thereupon effective to transfer said junction potential to said output electrode of said first transistor, thereby driving said stage from one stable state in said series to an adjacent one, so that the number of states through which the stage passes is a count of the number of input pulses.

15. A counter circuit comprising a multistable stage including a first transistor having an output electrode and an input electrode, a step function impedance network connected to said output electrode as a load, feedback means connected between said output electrode and said input electrode; said transistor, said network and said feedback means cooperating to overcome said bias and switch the second transistor on, said second transistor being thereupon effective to transfer said potential of said one junction to said point in said multistable stage, thereby driving said stage from one stable state in said series to an adjacent one, so that the number of states through which the stage passes is a count of the number of input pulses.

16. A counter circuit is defined in claim 15, in which said input pulse supply means has a predetermined time constant, and including a capacitor connected to said voltage divider and effective to establish at said one junction a substantially longer time constant, so that each input pulse terminates before said one junction is driven to a new potential value by the stepping action initiated by that input pulse.

17. A counter circuit as defined in claim 5, in which said feedback means comprises a constant current source, means directly connecting said constant current source to said input electrode, and means including a resistor connecting said constant current source to said output electrode.

18. A counter circuit for counting a series of input signal pulses comprising a binary trigger circuit having an input connected to receive said pulses and an output and adapted to produce a pulse at said output upon receipt of every second input pulse of the series; a multistable stage including a first translating device having an output electrode and an input electrode, a step function impedance network connected to said output electrode as a load, feedback means connected between said output electrode and said input electrode; said translating device, said network and said feedback means cooperating to establish said stage in any one of a series of stable states defined by predetermined potentials at one electrode of said device, the several states in the series being separated by predetermined, substantially equal, potential increments of said one electrode within which increments the stage is unstable, and input gate means for stepping said stage through said series of states, one at a time, comprising a source of potential having a value fixed in relation to the value of one of said increments, and means including said source for supplying to one electrode of said device a potential substantially equal to the potential defining one of the states adjacent in the series to the existing state, thereby driving said stage from said existing state to said adjacent state, and means connecting said multistable stage and said binary trigger circuit in cascade.

19. A counter circuit as defined in claim 18, in which said multistable stage has a series of five stable states determined by said different biasing potentials, and is shifted from one state to the next by an input pulse, and includes means to produce an output signal pulse whenever it reaches the last state of the series, and means to reset the multistable stage at the first state of the series when said output signal is produced, said cascaded stage and circuit cooperating to produce an output signal for each ten input signal pulses.

References Cited in the file of this patent

UNITED STATES PATENTS

| | | |
|---|---|---|
| 2,486,391 | Cunningham | Nov. 1, 1949 |
| 2,647,238 | Bailey | July 28, 1953 |
| 2,652,460 | Wallace | Sept. 15, 1953 |
| 2,701,303 | Wells | Feb. 1, 1955 |
| 2,714,702 | Shockley | Aug. 2, 1955 |
| 2,743,359 | Sayre | Apr. 24, 1956 |
| 2,773,980 | Oliver | Dec. 11, 1956 |
| 2,810,072 | Amatniek | Oct. 15, 1957 |

UNITED STATES PATENT OFFICE
Certificate of Correction

Patent No. 2,903,604

September 8, 1959

Robert A. Henle

It is hereby certified that error appears in the printed specification of the above numbered patent requiring correction and that the said Letters Patent should read as corrected below.

Column 4, line 18, for "circuit fo" read —circuit of—; column 9, line 61, strike out "unit"; column 17, line 1, after "G. L. Pearson and" insert —B. Sawyer in their article entitled "Silicon PN Junction"—; column 22, line 59, after "cooperating to" insert —establish said stage in any one of a series of stable states defined by predetermined output electrode potentials, the several states in the series being separated by substantially equal potential increments, within which increments the stage is unstable; and input gate means for stepping said stage through said series of states, step by step, comprising a voltage divider including a source of direct potential, first, second and third resistors, means connecting said potential source and said resistors in series to a point in said stage having a potential varying with the state of the stage, said voltage divider being effective at each stable state of said stage to develop at one junction between two of the resistors a potential substantially equal to the potential at said point in said multistable stage defining the next adjacent state in the series, a second transistor having base, emitter and collector electrodes, means connecting said base and emitter electrodes respectively to the two junctions between the resistors in said voltage divider, the resistor between the junctions having a potential drop established across it with a magnitude and polarity effective to bias said second transistor off, means connecting the collector electrode to the output electrode of the first transistor, means connected to the base electrode of said second transistor for supplying a series of input pulses separated in time, each having a polarity and magnitude effective—.

Signed and sealed this 13th day of September 1960.

[SEAL]

Attest:
KARL H. AXLINE,
*Attesting Officer.*

ROBERT C. WATSON,
*Commissioner of Patents.*